(12) United States Patent  
Bonanno et al.

(10) Patent No.: US 7,082,520 B2  
(45) Date of Patent: Jul. 25, 2006

(54) BRANCH PREDICTION UTILIZING BOTH A BRANCH TARGET BUFFER AND A MULTIPLE TARGET TABLE

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/143,621

(22) Filed: May 9, 2002

(65) Prior Publication Data

US 2003/0212882 A1    Nov. 13, 2003

(51) Int. Cl.  
*G06F 9/32* (2006.01)  
*G06F 9/38* (2006.01)  
*G06F 9/42* (2006.01)

(52) U.S. Cl. .................. 712/236; 712/238; 712/240  
(58) Field of Classification Search ................ 712/236, 712/237, 238, 239, 240  
See application file for complete search history.

(56) References Cited

U.S. PATENT DOCUMENTS

| 5,706,492 | A  | * | 1/1998 | Hoyt et al. ............... 712/238 |
| 6,189,091 | B1 | * | 2/2001 | Col et al. ................. 712/240 |
| 6,247,122 | B1 | * | 6/2001 | Henry et al. ............. 712/239 |
| 6,347,369 | B1 | * | 2/2002 | Witt ......................... 712/240 |
| 6,601,161 | B1 | * | 7/2003 | Rappoport et al. ..... 712/238 |

* cited by examiner

*Primary Examiner*—Henry W. H. Tsai  
*Assistant Examiner*—Tonia L. Meonske  
(74) *Attorney, Agent, or Firm*—Lynn L. Augspurger

(57) ABSTRACT

Improved Branch prediction utilizes both a Branch Target Buffer (BTB) and a Multiple Target Table (MTT) for providing the capability to predict multiple targets for a single branch. A MTT when used in conjunction with a BTB allows for branches which have changing targets to be able to selectively choose the target of choice based on the execution path that was taken that lead to the given branch. The method predicts traget addresses, and between the static and dynamic target address, and upon finding a hit, the target is sent to the instruction cache such that a fetch can begin for the current target address and the target address is sent back to the Branch Target Buffer (BTB) to begin the search for the next branch given the current target predicted address. Upon resolving a branch the dynamic target is placed in MTT for future use.

15 Claims, 3 Drawing Sheets

BRANCH PREDICTION UTILIZING BOTH A BRANCH TARGET BUFFER AND A MULTIPLE TARGET TABLE

FIELD OF THE INVENTION

The present invention relates generally to computer processing systems and, in particular, to a method and apparatus for predicting branch targets in a computer processing system. The invention for predicting targets may be employed in situations where a given branch has multiple targets, including, but not limited to, sub-routine returns and branches with targets subject to program store compare.

Trademarks: IBM is a registered trademark of International Business Machines Corporation, Armonk, N.Y., U.S.A. Other names may be registered trademarks or product names of International Business Machines Corporation or other companies.

BACKGROUND

A basic pipeline microarchitecture of a microprocessor processes one instruction at a time. The basic dataflow for an instruction follows the steps of: instruction fetch, decode, execute, and result write back. Each stage within a pipeline or pipe must occur in order and hence a given stage can not progress unless the stage in front of it is progressing. In order to achieve highest performance, one instruction will enter the pipeline every cycle. Whenever the pipeline has to be delayed or cleared, this adds latency which in turns can be monitored by the performance a microprocessor carries out a task.

There are many dependencies between instructions which prevent the optimal case of a new instruction entering the pipe every cycle. These dependencies add latency to the pipe. One category of latency contribution deals with branches. When a branch is decoded, it can either be taken or not taken. A branch is an instruction which can either fall though to the next sequential instruction, not taken, or branch off to another instruction address, taken, and carry out execution of a different series of code. At decode time, the branch is detected, and must wait to be resolved in order to know the proper direction the instruction stream is to proceed. By waiting for potentially multiple pipeline stages for the branch to resolve the direction to proceed, adds latency into the pipeline. To overcome the latency of waiting for the branch to resolve, the direction of the branch can be predicted such that the pipe begins decoding either down the taken or not taken path. At branch resolution time, the guessed direction is compared to the actual direction the branch was to take. If the actual direction and the guessed direction are the same, then the latency of waiting for the branch to resolve has been removed from the pipeline in this scenario. If the actual and predicted direction miscompare, then decoding proceeded down the improper path and all instructions in this path behind that of the improperly guessed direction of the branch must be flushed out of the pipe, and the pipe must be restarted at the correct instruction address to begin decoding the actual path of the given branch. Because of the controls involved with flushing the pipe and beginning over, there is a penalty associated with the improper guess and latency is added into the pipe over simply waiting for the branch to resolve before decoding further. By having a high rate of correctly guessed paths, the ability to remove latency from the pipe by guessing the correct direction out weighs the latency added to the pipe for guessing the direction incorrectly.

In order to improve the accuracy of the guess associated with the guess of a branch, a branch history table (BHT) can be implemented which allows for direction guessing of a branch based on the past behavior of the direction the branch previously went. If the branch is always taken, as is the case of a subroutine return, then the branch will always be guessed as taken. IF/THEN/ELSE structures become more complex in their behavior. A branch may be always taken, sometimes taken and not taken, or always not taken. Based on the implementation of dynamic branch prediction, will determine how the BHT predicts the prediction of the branch.

When a branch is guessed taken, the target of the branch is to be decoded. The target of the branch is acquired by making a fetch request to the instruction cache for the address which is the target of the given branch. Making the fetch request out to the cache involves minimal latency if the target address is found in the first level of cache. If there is not a hit in the first level of cache, then the fetch continues through the memory and storage hierarchy of the machine until instruction address for the target of the branch is acquired. Therefore, any given taken branch detected at decode has a minimal latency associated with it that is added to the amount of time it takes the pipeline to process the given instruction. Upon missing a fetch request in the first level of memory hierarchy, the latency penalty the pipeline pays grows higher and higher the further up the hierarchy the fetch request must progress until a hit occurs. In order to hide part or all of the latency associated with the fetching of a branch target, a branch target buffer (BTB) can work in parallel with a BHT.

Given a current address which is currently being decoded from, the BTB can search for the next instruction address from this point forward which contains a branch. Along with storing the instruction addresses of branches in the BTB, the target of the branch is also stored with each entry. With the target being stored, the address of the target can be fetched before the branch is ever decoded. By fetching the target address ahead of decode, latencies associated with cache misses can be minimized to the point of the time it takes between the fetch request and the decode of the branch.

In respect to branch targets, a branch can either have a single constant target or multiple changing targets. A branch in a for loop for example has a single target which is the branch that creates the loop. A subroutine call, likewise, will have one target, that of the address of the subroutine. The RETURN of the subroutine can have multiple targets over its usage. The RETURN will branch back to the next sequential instruction in the code stream which called the subroutine. Placing multiple targets in a BTB proves ineffective for two fold. First, the BTB is searched via branch address, there is no way to determine which target would be selected as the branch with multiple targets is one branch and hence it is always located in the BTB with the same information, its instruction address. Secondly, the BTB is uniform and hence has the same amount of information for each entry within the BTB. To create multiple target entries in the BTB would be to create them for every single entry which will be a massive overuse of silicon area and power. Given a single target entry per BTB, most likely the last known target for the given branch is stored in the BTB. While other schemes could be used for the target address within the BTB, it can only predict the target correct for a single target of the given branch.

By creating a side Multiple Target Table (MTT) which contains only target branches and is addressed based on code path, the BTB can have a single additional bit per entry which states whether to predict the target via the BTB or to override the BTB with a guess via the MTT; thereby allowing multiple predictable targets for a branch to exist. Correctly identifying which target is the correct prediction based on the path that was taken to the given branch will allow for higher accuracy of predicted targets on multi-target branches and, hence, remove latency from the pipe and increase system performance.

There have been many methods to improve branch prediction which include those in the patents discussed below; however, they place focus on the prediction accuracy of direction, or concerns with branch targets deal with the use of a BTB or a call-return stack where a stack is implemented that assigns a return address (next sequential address in regard to the branch address) to the return stack whenever a call branch is encountered. U.S. Pat. No. 6,289,444—"Method and Apparatus for Subroutine Call-Return Prediction" targets prediction based on creating a table to determine branches which 'call' a routine in which place the routine will have a 'return'. U.S. Pat. No. 5,935,241—"Multiple Global Pattern History Tables for Branch Prediction in a Microprocessor" deals with increasing the accuracy of guessing the direction (taken or not taken) of a given branch. U.S. Pat. No. 5,903,750—"Dynamic Branch Prediction for Branch Instructions with Multiple Targets" deals with creating a BTB that has multiple entries for each branch that is placed into the BTB. These multiple entries in U.S. Pat. No. 5,903,750 are narrowed down to one entry through the use of past history to arrive at the given branch. Such an implementation provides a large increase to the BTB size for all branches written in, if or if not, they have multiple entries; and, furthermore, it limits the number of multiple targets an entry can have by the number of entries an individual entry has.

The implementation presented in this invention allows for a total number of dynamic targets based on the size of a second lookup table, the MTT. The usage of assigning targets to a branch is dynamic, each branch call be allocated a total of multiple targets ranging from 0 to the size of the table.

SUMMARY OF THE INVENTION

This disclosure presents a method for selecting a predicted target address of a branch with multiple targets in a microprocessor, which contains the ability to predict branches, where the method includes:(a) predicting an address corresponding to the next branch; (b) predicting a static target address of a predicted branch; (c) predicting a dynamic target address of a predicted branch; and then (d) selecting between the static and dynamic target address. The method determines whether a branch has multiple targets and includes selecting the BTB or MTT target, addressing the MTT, and updating the MTT. In the present invention, a method for determining if a branch has a single target or multiple targets based on past history is used in determining if the BTB target guess should be used or overridden via the target guess of the MTT. The MTT table consist of entries addressed partially by the branch pattern that was required to arrive at the given branch. Upon resolving a branch in respect to taken or not taken, determination of its target being static, constant, or dynamic, must be determined. If the branch target is deemed dynamic, then the target must be placed in the MTT for future use as only dynamic targets need be placed into the MTT.

These and other aspects, features and advantages of the present invention will become apparent from the following detailed description of preferred embodiments, which is to be read in connection with the accompanying drawings. For a better understanding of the invention with advantages and features, refer to the description and to the drawings.

Figure 1:
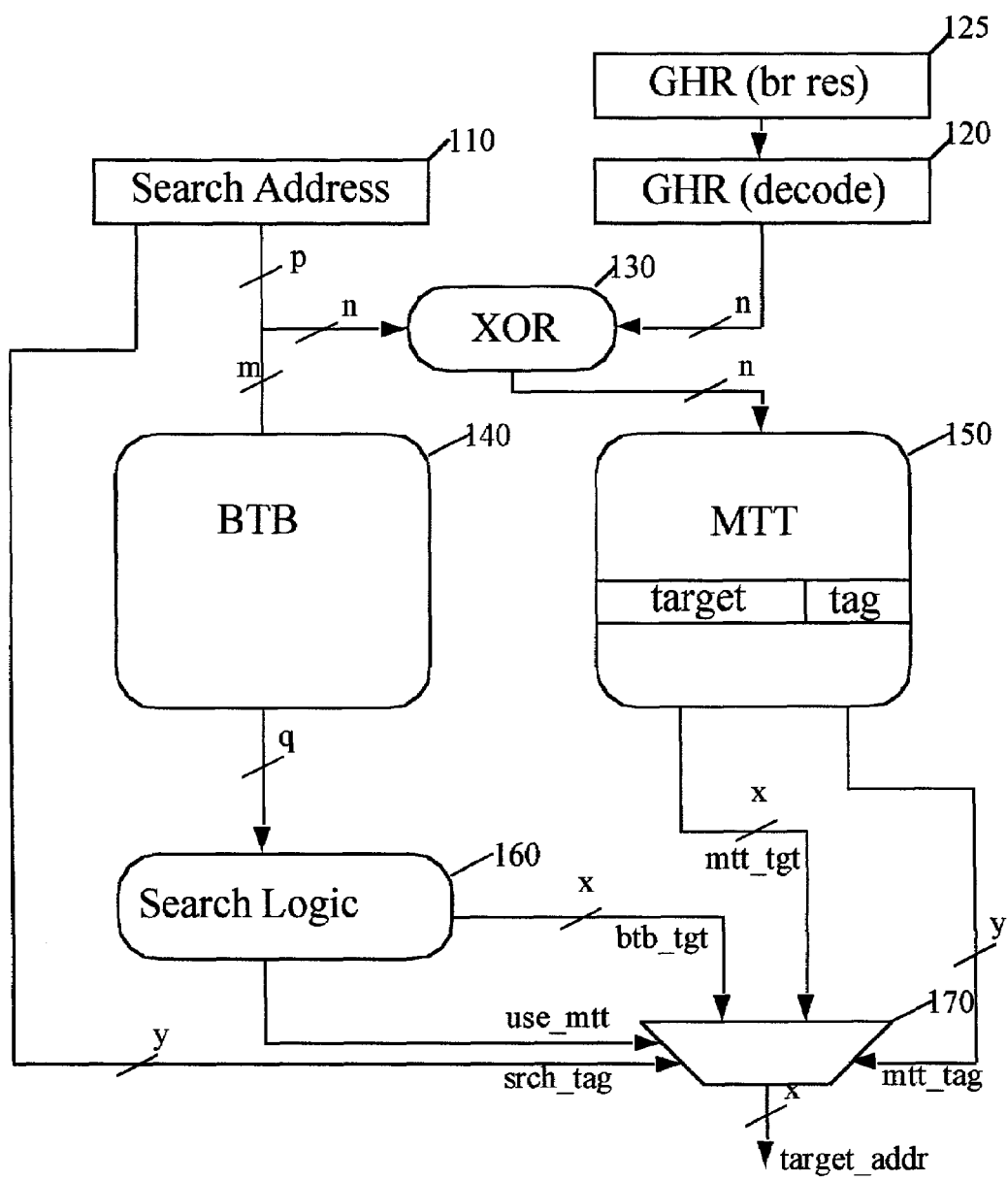
FIG. 1 illustrates our preferred dataflow interaction between BTB and MTT.
Figure 2:
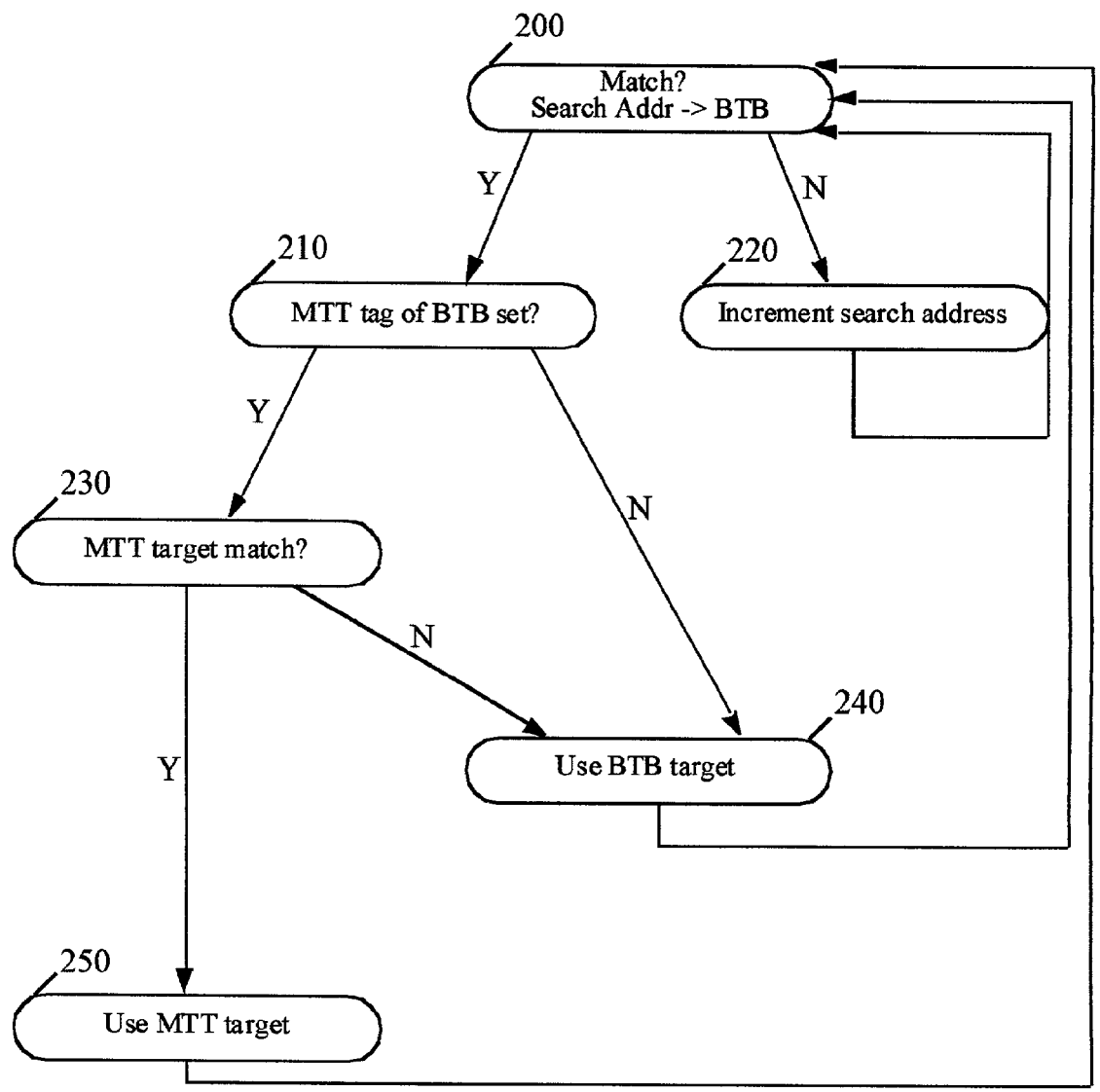
FIG. 2 illustrates logic steps of looking for a hit.
Figure 3:
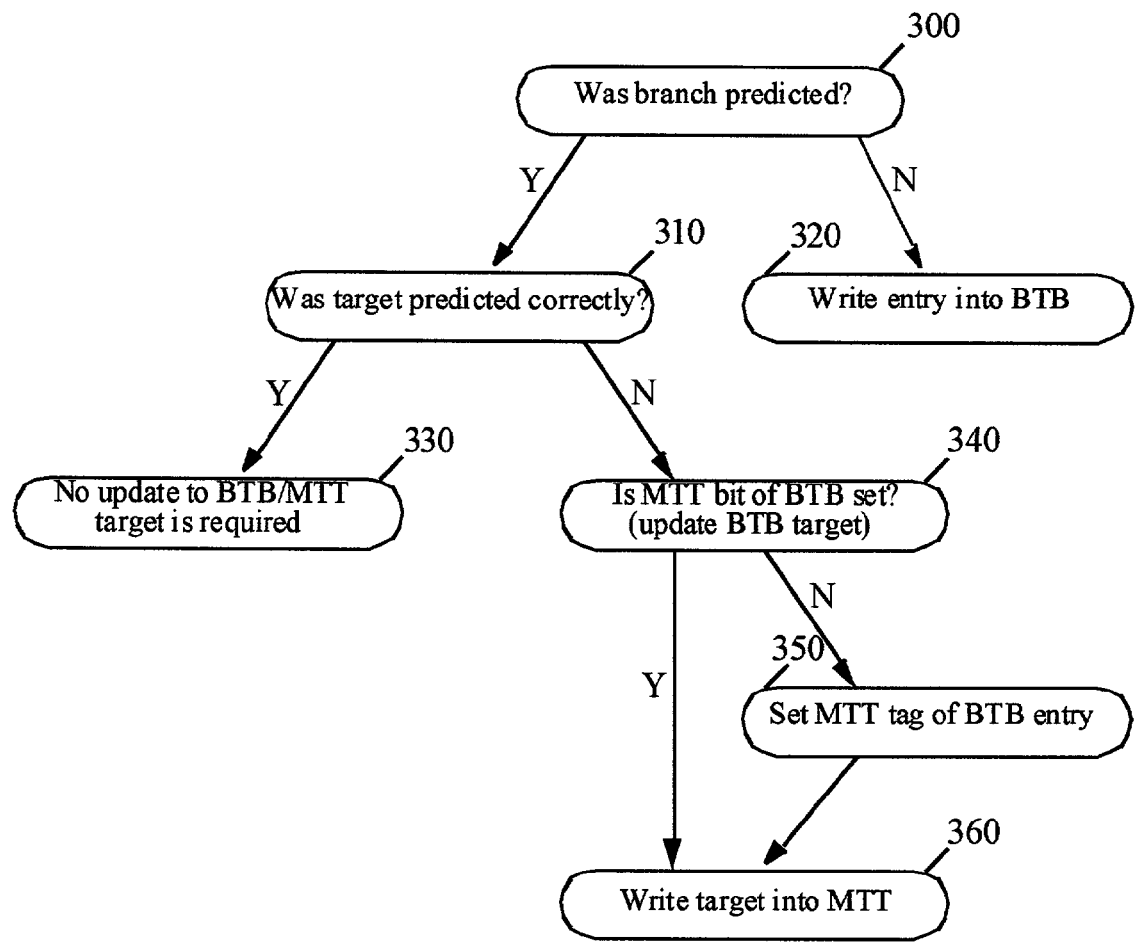
FIG. 3 illustrates logic steps of making a write.

Our detailed description explains the preferred embodiments of our invention, together with advantages and features, by way of example with reference to the drawings.

DETAILED DESCRIPTION OF THE INVENTION

The present invention is directed to a method and apparatus for predicting targets of branches which have multiple targets. The presented method provides a high target prediction accurate rate and efficient search mechanism.

A branch target buffer (BTB) 140 is perfect at predicting the target of a branch when the target remains constant. Within the BTB is the htag which contains high order address bits, ltag which contain low order address bits, target address, and MTT (multiple target table) tag bit. The search address sent to the BTB is the range of bits htag and ltag. A match 160, 200 is found when 1) the value of htag is equal to the value of the associated search address bits and 2a) either the search address is the entry line being searched in the BTB and the ltag bits are greater than or equal to the value of the associated search address bits, or 2b) the entry line being searched is greater than the search address line sent. When a match is not found 220 within the first line of the BTB being searched on a given cycle, searching proceeds to the following line on a following cycle. This process continues until a hit is found 210 or a new search is started; hence, ending the current search in process.

Upon finding a hit, the target is sent to the instruction cache such that a fetch can begin for the current target address. Furthermore, the target address is sent back to the BTB 240 to begin the search for the next branch given the current target predicted address.

A surprise branch 300 is a branch which is decoded but not predicted. When a surprise branch is encountered, it will be written into the BTB 320 such that it can be predicted in the future. The write to the BTB will update all three fields: htag, ltag, and target.

If a branch resolves and the target has not changed 310, than an update to the BTB and MTT is not required 330. For every time the branch target changes, the BTB is respectively updated. In addition to updating the target address, if the MTT tag 340 is not set in the BTB it will be set 350. The MTT tag denotes that only the target has been updated and this is from a branch which now has a different target from the previous encounter. In the case of multiple subroutine returns of a given subroutine for example, every time the call to the sub routine is from a different address, the RETURN prediction of the subroutine will be incorrect. In order to get the RETURN target prediction correct given the fact that it has been seen before, it needs to be possible to remember multiple targets of a given branch. Furthermore, it needs to be detectable as to which target should be used in predicting a RETURN call. In order to determine which target to use for a given branch, the address of the branch itself presents zero information to how the branch was reached, only that the branch was reached. How the branch was reached depends on the set of instructions that occurred before the branch, particular the pattern of branches that occurred before the branch target which is to be predicted. The sequence of non-branches required to get to a branch is non important as they do not have the ability to change direction within the code. Branches prior to the branch whose target is to be predicted tell the pattern of basic blocks that was executed to get to the current branch.

In order to determine the pattern of past branches prior to this point, a global history register 120 is used to record the direction of the last 'n' branches. Global history is to be kept in respect to decode 120 and respect to execute 125. Every time a branch is decode as taken a '1' is pushed into the least significant bit of the decode GHR, and as a result, the most significant bit of the GHR is pushed out. Likewise, every time a not taken branch is decoded, a '0' is pushed onto the decode GHR. A similar stack 125 is kept in regard to branch resolution. This is the time frame when the branch is determined as actually being taken or not taken. Hence the decode GHR 120 is the speculative branch path and the execute GHR 125 is the actual resolved branch path. In the case of a branch being guessed in the wrong direction, the decode GHR has recorded the speculative path which is incorrect while the execute GHR has recorded the resolved branch path. In such a case, the pipeline needs to be flushed and restarted at the correct directive target of the mispredicted branch. During the flush, the decode GHR needs to be synched up with the execute GHR.

By XORing 130 the global history with the search address 110, it creates an unique array index which is both based on a branch at a given address and the patterns of branches that was taken and not taken in order to get to the current branch. Like the BTB, the MTT 150 contains a similar tag which consist of bits from the search address used to find the branch whose target is stored in the MTT entry. The reason for such a tag is because pattern history is being used as part of the lookup address, several branches may map to the same MTT entry. When making a target prediction, it would be useless to use the predicted target of a completely different branch. Unlike the BTB, the MTT is a single cycle lookup as it is not solely address based, but additionally pattern based.

Each MTT entry contains a target and a tag. The tag is 'y' bits in length and is used to compare against 'y' associated bits of the search address. These bits must match 170 for a hit to occur within the MTT. The target field is the predicted target address associated with this entry for a branch.

With the ability to predict a single target for a given address and the ability to predict a single target for a given address in combination with the pattern of taken and not taken branches to reach the given branch, a decision must be made in regard of how to select a target from the BTB or MTT for a given branch. When a branch is located via the BTB 200, the MTT tag field is examined 210. If this bit is a zero, then the branch target has never changed and hence the branch is not classified as a changing target branch. With this classification, the predicted target for the branch is selected via the BTB target 240 field. If the BTB entry for a given branch prediction has the MTT tag bit set as a value of one, then the target of the predicted branch has contained more than one target in the past history of the prediction of the given branch. The MTT target 230 will be used if the lookup from the MTT resoluted with the MTT tag matching the search address 250. If the MTT tag 230 does not match with the search address, then even though the BTB's MTT tag is set, the BTB target 240 will be used as the predicted target for the given branch as the MTT does not contain an entry for the given address of taken/not taken branches that had occurred in reaching the given predicted branch. When the BTB's MTT tag does not result in selecting the MTT for the predicted target address, then an entry must be made into the MTT if the MTT is to predict this target on the following occurrence of this exact pattern. When the actual target of the predicted branch is computed, the branch's address, target, and path information is used to write an entry into the MTT 360.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of processing branch targets in a computer systems for a local microprocessor having branch prediction and an instruction cache using a Branch Target Buffer (BTB) comprising of:
   (a) predicting an address corresponding to a next branch;
   (b) predicting a static target address of a predicted branch; and
   (c) predicting a dynamic target address of a predicted branch; and then
   (d) selecting between the static and dynamic target address wherein;
   upon finding a hit during selecting between the static and dynamic target addresses, the target is sent to the local microprocessor's instruction cache such that a fetch can begin for the current target address and the target address is sent back to the Branch Target Buffer (BTB) and a global history register (GHR) is speculatively updated immediately following and based upon a prediction of a dynamic target address of said next branch a speculative GHR is used to access a Multiple Target Table (MTT) in searching for a predicted target address for said next branch, and
   wherein the step of selecting between the static and dynamic target address includes selecting between two predicted target addresses based on entry information supplied from said branch target buffer (BTB) and said Multiple Target Table (MTT) and upon resolving a branch the dynamic target is placed in said Multiple Target Table (MTT) for future use when the resolved dynamic taken branch of said branch target buffer (BTB) initially resolves with a different target address computation than employed when predicted via said branch target buffer (BTB).

2. The method as defined in claim 1 wherein predicting includes predicting an address of the location of the next branch in a given address space given a starting address point.

3. The method of claim 2, further comprising a step of updating the branch target buffer (BTB) with a new branch address entry upon resolution when a branch entry is currently not in the BTB.

4. The method as defined in claim 1 wherein predicting the static target address includes predicting a branch target address of a given branch based on the associated target of a last occurrence of the branch at the given address.

5. The method of claim 4, further comprising a step of updating the branch target buffer (BTB) with a new branch target entry upon resolution when a branch entry is currently not in the BTB.

6. The method of claim 4, further comprising a step of updating the branch target buffer (BTB) with a modified branch target entry upon resolution when the predicted branch target does not match an actual calculated target of a given branch.

7. The method of claim 4, further comprising a step of updating the branch target buffer (BTB) by setting a multiple target table ( MTT) tag bit when an entry was found in the branch target buffer (BTB); but, however, the predicted branch target address was found to be incorrect based on the calculated target of the branch.

8. The method as defined in claim 1 wherein said predicting the dynamic target address includes predicting a target address of a given branch based on an associated target of the last occurrence of the branch based on the path of 'n' taken and not taken branches in addition to the address of the predicted branch and saving a speculative history updated immediately after a branch prediction is used in the Global History Register (GHR) to provide acceptable accuracy in selecting the dynamic target address from the Multiple Target Table (MTT).

9. The method of claim 8, further comprising a step of selecting a multiple target table ( MTT) entry through the partial use of the global history register (GHR) based on speculative decode in a speculative path.

10. The method of claim 8, further comprising a step of updating an execute based GHR in addition to that of a decode based global history register (GHR) wherein, the execute GHR is updated on resolved branch direction.

11. The method of claim 10, further comprising a step of copying said updated execute GHR into the decode GHR when a pipe of said local microprocessor is to be flushed and restarted.

12. The method of claim 8, further comprising a step of updating the multiple target table ( MTT ) with a new branch address entry upon resolution when the new branch address entry is currently not in the BTB.

13. The method of claim 8, further comprising a step of updating the multiple target table ( MTT ) with a modified branch target entry upon resolution when a predicted target address does not match an actual calculated target address of a given branch.

14. The method of claim 1, further comprising of using an MTT tag bit within the BTB to select between the BTB and MTT target address.

15. The method of claim 1, further comprising of comparing an MTT tag of the MTT to a search address; whereby, overriding the BTB's MTT tag bit to select the BTB target if the MTT tag of the MTT does not equal the search address.

* * * * *